US008638015B2

(12) United States Patent
Yoo et al.

(10) Patent No.: US 8,638,015 B2
(45) Date of Patent: Jan. 28, 2014

(54) MOTOR WITH ROTOR CASE HAVING COUPLING COMPONENT

(75) Inventors: Young Sun Yoo, Gyunggi-do (KR); Ho Jun Yoo, Gyunggi-do (KR); Yeol Choi, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 540 days.

(21) Appl. No.: 12/923,285

(22) Filed: Sep. 13, 2010

(65) Prior Publication Data

US 2011/0156527 A1 Jun. 30, 2011

(30) Foreign Application Priority Data

Dec. 24, 2009 (KR) ........................ 10-2009-0130842

(51) Int. Cl.
*H02K 5/16* (2006.01)
*H02K 5/167* (2006.01)
(52) U.S. Cl.
USPC ...... 310/91; 310/261.1; 310/67 R; 360/99.08; 360/99.09
(58) Field of Classification Search
USPC .............. 310/67 R, 90, 91, 261.1; 360/99.08, 360/99.09
IPC .............................................. H02K 5/16,5/167
See application file for complete search history.

(56) References Cited

U.S. PATENT DOCUMENTS

| 5,610,462 | A | * | 3/1997 | Takahashi | 310/90 |
| 5,747,908 | A | * | 5/1998 | Saneshige et al. | 310/91 |
| 6,759,772 | B1 | * | 7/2004 | Chang et al. | 310/67 R |
| 6,806,601 | B2 | * | 10/2004 | Miyamoto | 310/68 B |
| 2002/0074879 | A1 | * | 6/2002 | Jun | 310/90 |
| 2004/0135462 | A1 | * | 7/2004 | Masayuki | 310/261 |
| 2007/0274002 | A1 | * | 11/2007 | Kim et al. | 360/99.08 |
| 2007/0278880 | A1 | * | 12/2007 | Wada et al. | 310/90 |
| 2008/0179978 | A1 | * | 7/2008 | Ichizaki | 310/90 |
| 2009/0140589 | A1 | * | 6/2009 | Kim | 310/156.26 |
| 2010/0194250 | A1 | * | 8/2010 | Jung | 310/425 |
| 2010/0237730 | A1 | * | 9/2010 | Smirnov et al. | 310/90 |

FOREIGN PATENT DOCUMENTS

| JP | 2000-123466 | 4/2000 |
| JP | 2002-95196 | 3/2002 |
| JP | 2004-40886 | 2/2004 |
| JP | 2004-112885 | 4/2004 |
| JP | 2008-182830 | 8/2008 |
| KR | 10-2008-0078343 | 8/2008 |

OTHER PUBLICATIONS

Korean Office Action issued May 23, 2011 in corresponding Korean Patent Application 10-2009-0130842.
Japanese Office Action mailed May 29, 2012 issued in corresponding Japanese Patent Application No. 2010-197972.
Chinese Office Action issued Oct. 8, 2012 in corresponding Chinese Patent Application No. 201010293901.6.

* cited by examiner

*Primary Examiner* — Burton Mullins
*Assistant Examiner* — Michael Andrews

(57) ABSTRACT

A motor may include: a rotor case having a coupling hook extending downward in an axial direction, secured to a shaft, and performing rotation; a sleeve supporting the shaft; and a sleeve housing having a projection provided at a front end portion of an upper part thereof in the axial direction and a guide passage provided along the projection such that the coupling hook moves along the guide passage while the sleeve is pressed and inserted into an inner circumferential surface thereof.

9 Claims, 5 Drawing Sheets

MOTOR WITH ROTOR CASE HAVING COUPLING COMPONENT

CROSS-REFERENCE TO RELATED APPLICATIONS

This application claims the priority of Korean Patent Application No. 10-2009-0130842 filed on Dec. 24, 2009, in the Korean Intellectual Property Office, the disclosure of which is incorporated herein by reference.

BACKGROUND OF THE INVENTION

1. Field of the Invention

The present invention relates to motors, and more particularly, to a motor that allows for rotary engagement and disengagement between a coupling hook of a rotor case and a projection of a sleeve housing.

2. Description of the Related Art

In general, a spindle motor, which is provided inside an optical disc drive, rotates a disc so that an optical pickup device can read data recorded thereon.

In particular, in terms of an ultra-thin slim spindle motor, being currently used in a laptop computer, an optical disc drive needs to be lightweight, thin, and small. Also, there is a need to prevent damage to a rotor case during the high-speed rotation of the rotor case.

In the related art, in order to prevent damage to a rotor case rotating at a high rate inside a spindle motor, a ring-shaped stopper is fitted into a lower part of a shaft being exposed under a bearing in an axial direction.

However, this configuration makes it difficult to reduce the length of a rotary shaft, thereby hindering a reduction in weight, thickness, and size.

As for an ultra-thin, slim spindle motor, a hook-shaped stopper is bonded to a rotor case and engaged with a projection of a sleeve housing.

In this case, however, while the hook-shaped stopper of the rotor case is caught by the projection of the sleeve housing, assembly deformation may occur in the stopper.

In addition, once the hook-shaped stopper is engaged with the projection of the sleeve housing, the rotor case cannot be disassembled therefrom. This means that when failure occurs in circuit components for motor driving inside the rotor case, the entire motor needs to be exchanged.

SUMMARY OF THE INVENTION

An aspect of the present invention provides a motor that allows for rotary engagement and disengagement between a coupling hook of a rotor case and a projection of a sleeve housing.

According to an aspect of the present invention, there is provided a motor including: a rotor case having a coupling hook extending downward in an axial direction, secured to a shaft, and rotating; a sleeve supporting the shaft; and a sleeve housing having a projection provided at a front end portion of an upper part thereof in the axial direction and a guide passage provided along the projection such that the coupling hook moves along the guide passage while the sleeve is pressed and inserted into an inner circumferential surface thereof.

The coupling hook may include a plurality of elastic segments, each of which may include: a support portion disposed outside the projection in an outer diameter direction; and a hook portion extending inwardly from the support portion in an inner diameter direction.

The coupling hook may further include an annular ring fixing the support portion.

The annular ring may be inserted and fixed into an annular ring insertion groove at least partially provided in the rotor case.

The hook portion may include a guide protrusion being inserted along the guide passage.

The hook portion may have a smaller width than the support portion.

The hook portion may have a shape corresponding to that of the guide passage.

The guide passage may be provided in a clockwise manner.

The guide passage may be a groove provided within the projection.

The projection may include a plurality of segments, and the guide passage may include cutting grooves between the plurality of segments of the projection.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
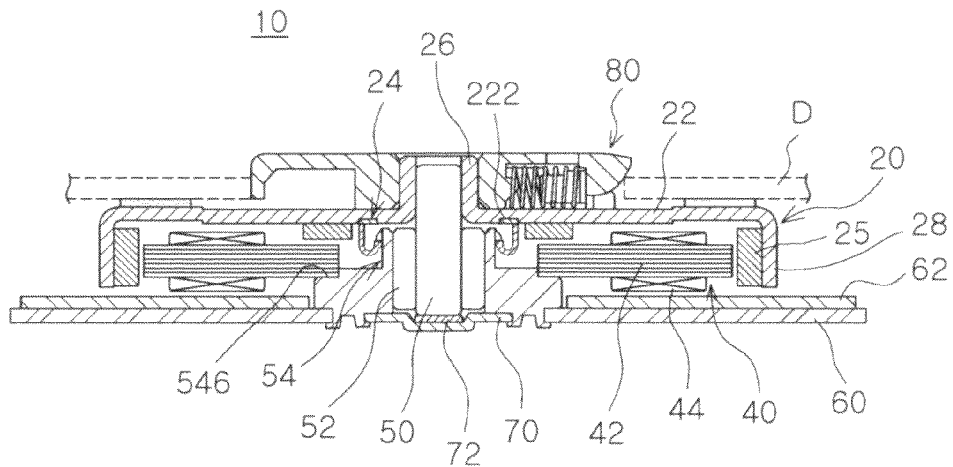
FIG. 1 is a schematic sectional view illustrating a motor according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. While those skilled in the art could readily devise many other varied embodiments that incorporate the teachings of the present invention through the addition, modification or deletion of elements, such embodiments may fall within the scope of the present invention.

In the drawings, the shapes and dimensions may be exaggerated for clarity, and the same reference numerals will be used throughout to designate the same or like components.

Figure 2:
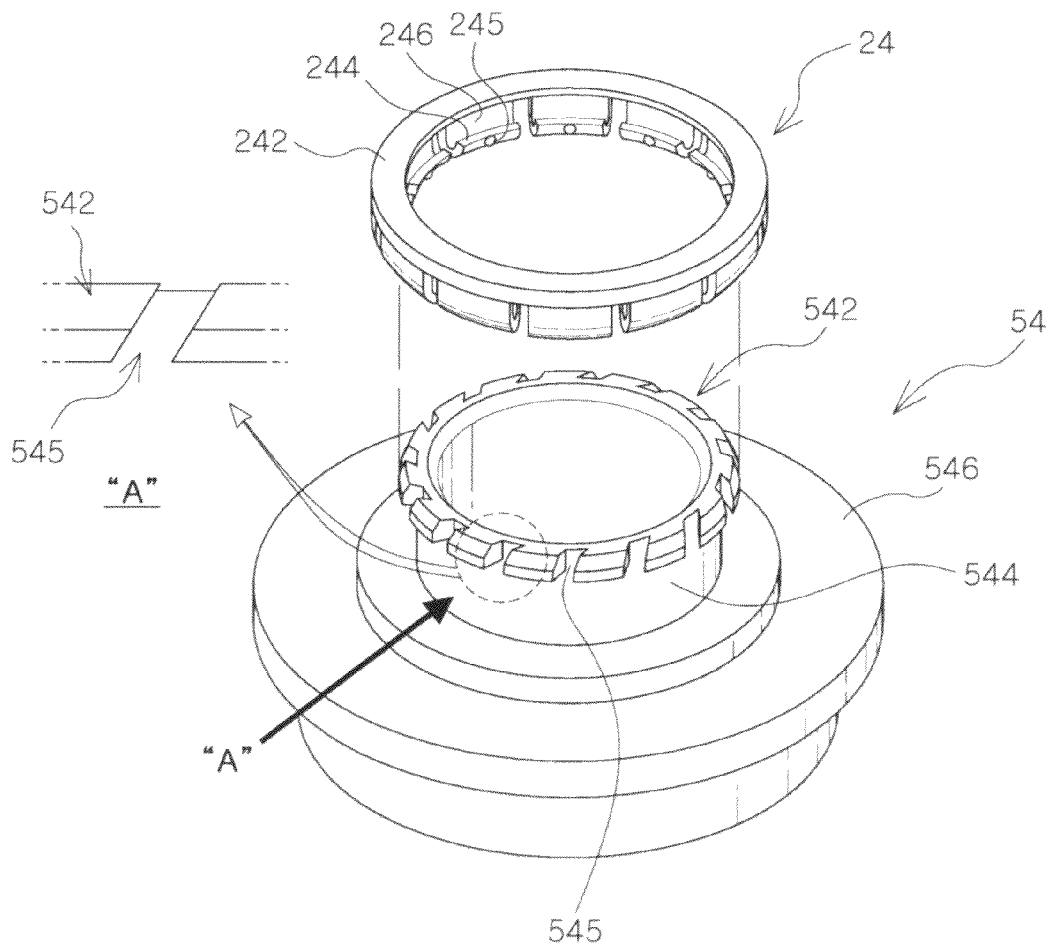
FIG. 2 shows an exploded schematic perspective view illustrating a sleeve housing and a coupling hook according to an exemplary embodiment of the present invention and a schematic front view illustrating a projection of the sleeve housing as viewed in direction A.

FIG. 1 is a schematic sectional view illustrating a motor according to an exemplary embodiment of the invention. FIG. 2 shows an exploded schematic perspective view illustrating a sleeve housing and a coupling hook according to an exemplary embodiment of the invention and a schematic view illustrating a projection of the sleeve housing as viewed in direction A.

Referring to FIGS. 1 and 2, a motor 10 according to this embodiment may include a rotor case 22, a sleeve 52, and a sleeve housing 54.

Here, the motor 10 is a spindle motor that is applied to an optical disc drive rotating a disc D, and includes a stator 40 and a rotor 20.

The rotor 20 includes a rotor case 22 that is cup-shaped and has a magnet 25 having an annular shape along the outer circumference thereof corresponding to a coil 44 of the stator 40. Here, the magnet 25 is a permanent magnet that has magnetic north and south poles magnetized alternately in the circumferential direction to thereby generate a magnetic force having a predetermined magnitude.

The rotor case 22 includes a rotor hub 26 being pressed and coupled to the shaft 50 and a magnet coupling portion 28 having the magnet 25, having the annular shape, disposed therein. The rotor hub 26 is bent upwards in the axial direction in order to maintain an unmating force between the rotor hub 26 and the shaft 50. A chucking device 80 is coupled to the outer circumferential surface of the rotor hub 26 in order to load the disc D.

The stator 40 means any type of stationary member except for a member being rotated. The stator 40 includes a base plate 60, the sleeve housing 54, a core 42, and a winding coil 44. A printed circuit board 62 is provided on the base plate 60. The sleeve housing 54 supports the sleeve 52 by pressing and inserting the sleeve 52 therein. The core 42 is secured to a core mounting portion 546 of the sleeve housing 54. The winding coil 44 is wound around the core 42.

The magnet 25, provided along the inner circumferential surface of the magnet coupling portion 28, faces the winding coil 44. An electromagnetic interaction between the magnet 25 and the winding coil 44 induces the rotation of the rotor 20.

Furthermore, in this embodiment, a projection 542 is formed at a front end portion of an upper part of the sleeve housing 54 in the axial direction so that a coupling hook 24 is engaged with the protrusion, thereby preventing damage to the rotor case 22.

Meanwhile, terms used herein in associated with directions will now be defined. As viewed in FIG. 1, the axial direction means a vertical direction on the basis of the shaft 50, and an outer diameter direction or an inner diameter direction means a direction toward the outer end of the rotor 20 on the basis of the shaft 50 or a central direction of the shaft 50 on the basis of the outer end of the rotor 20.

In this embodiment, there is no need to form a stopper groove by partially exposing the shaft 50 under the sleeve 52, thereby enabling further reduction in the thickness of the motor 10.

A thrust washer 72 and a sealing plate 70, sealing the thrust washer 72, are formed under the shaft 50.

Here, the sleeve housing 54 is coupled to the base plate 60 and the sealing plate 70 by caulking and stands on the base plate 60.

The sleeve housing 54 may include a barrel portion 544 forming a body and the projection 542. Here, the projection 542 is formed at the front end portion of the upper part of the barrel portion 544 in the axial direction and protruding outwardly in an outer diameter direction.

The projection 542 includes a guide passage 545 allowing for the rotation of the coupling hook 24. The guide passage 545 is formed clockwise. When the coupling hook 24 is engaged with the projection 542, the guide passage 545 causes the coupling hook 25 to be assembled into the projection 542 through clockwise rotation.

Therefore, the rotor case 22 is not affected by the motor 10 rotating clockwise. The rotor case 22 is released from the projection 542 along the guide passage 545 through counterclockwise rotation.

The coupling hook 24 includes a plurality of elastic segments, each of which may include a support portion 246 disposed outside the projection 542 in the outer diameter direction and a hook portion 244 extending inwardly from the support portion 246 in the inner diameter direction.

The coupling hook 24 may include an annular ring 242 that supports the support portions 246. The annular ring 242 may be inserted and fixed into an annular ring insertion groove 222 that is at least partially formed in the rotor case 22.

The annular ring 242 is inserted into the annular ring insertion groove 222 formed into the rotor case 22, thereby achieving further miniaturization of the motor 10.

Here, in order to further facilitate rotation assembly, the hook portion 244 may include a guide protrusion 245 that is inserted along the guide passage 545. The guide protrusion 245 may be protruding inwardly from the hook portion 244 in the inner diameter direction.

Figure 3:
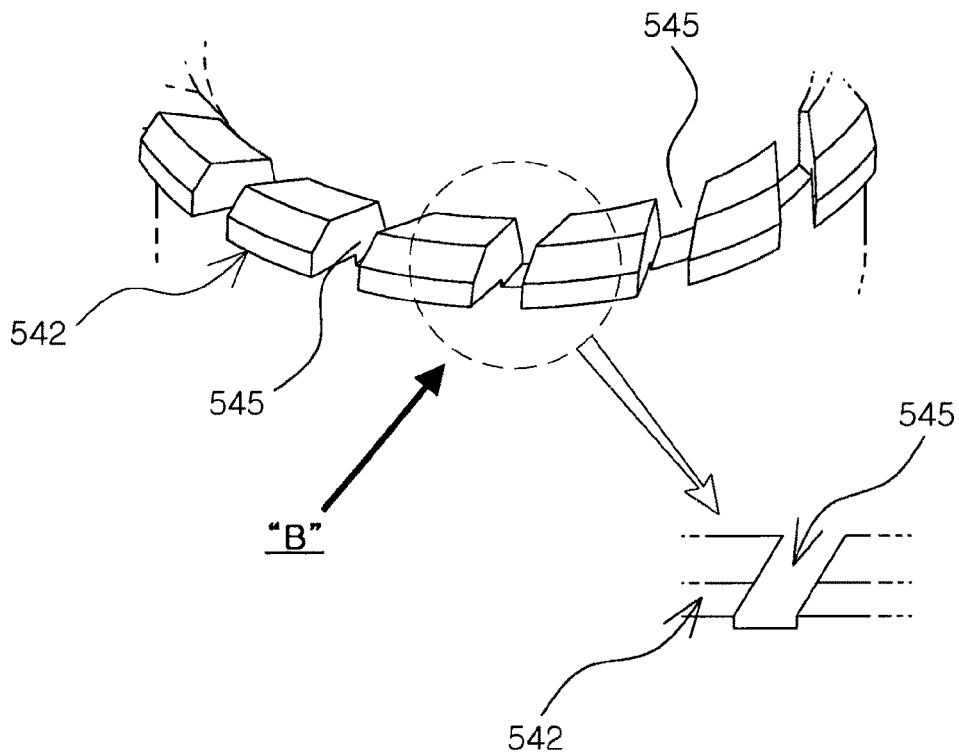
FIG. 3 shows a perspective view illustrating a projection of a sleeve housing according to another exemplary embodiment of the present invention and a schematic front view illustrating the projection of the sleeve housing as viewed in direction B.

FIG. 3 shows a perspective view illustrating a projection of a sleeve housing according to another exemplary embodiment of the invention and a perspective view illustrating the projection of the sleeve housing as viewed in direction B.

While the sleeve housing 54 according to the embodiment, shown in FIG. 2, includes the guide passage 545 having recesses formed along the projection 542, the sleeve housing 54 according to this embodiment, shown in FIG. 3, includes the guide passage 545 having cutting grooves formed in the projection 542 such that the projection 542 is formed into a plurality of segments while the cutting grooves of the guide passage 545 are provided between the segments of the protrusion 542.

Since the projection 542 of the sleeve housing 54 may be deformed radially inwardly, the cutting grooves facilitate a rotary engagement between the coupling hook 24 and the sleeve housing 54.

A hook portion of a coupling hook according to the exemplary embodiments of the invention will now be described with reference to FIGS. 4 through 8.

Figure 4:
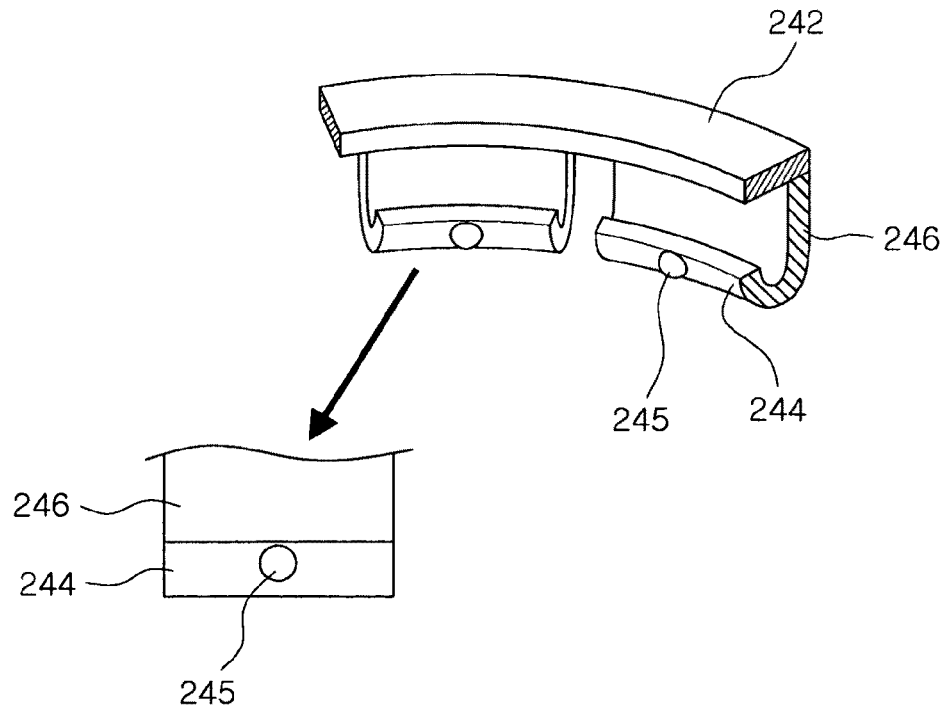
FIG. 4 is a schematic view illustrating hook portions of a coupling hook according to an exemplary embodiment of the present invention.

The hook portion 244 of the coupling hook 24 according to an exemplary embodiment, shown in FIG. 4, has guide protrusions 245 that are inserted along the guide passage 545 of the sleeve housing 54.

The guide protrusion 245 according to the embodiment, shown in FIG. 4, is a round protrusion and may protrude inwardly of the hook portion 244 in the inner diameter direction.

Figure 5:
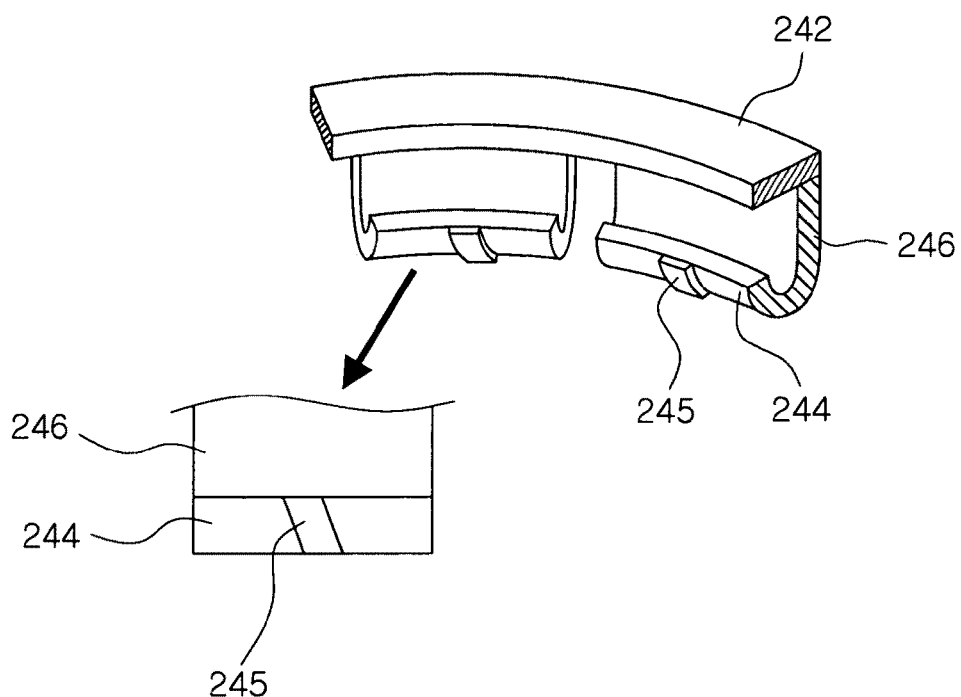
FIG. 5 is a schematic view illustrating hook portions of a coupling hook according to another exemplary embodiment of the present invention.

The hook portion 244 of the coupling hook 24 according to another exemplary embodiment, shown in FIG. 5, has the guide protrusion 245 having a shape corresponding to the above guide passage.

Figure 6:
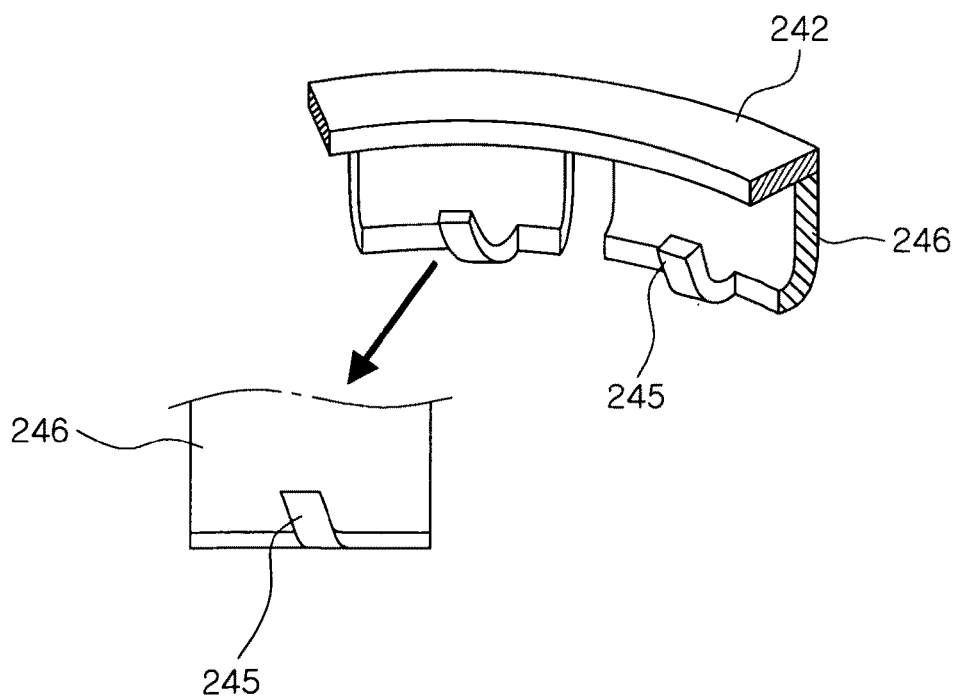
FIG. 6 is a schematic view illustrating hook portions of a coupling hook according to another exemplary embodiment of the present invention.

Instead of the guide protrusions 245, like the hook portions 244 of the coupling hook 24, shown in FIG. 6, the hook portions 244 may have a shape corresponding to the guide passage 545 and extend from the respective support portions 246 so that the hook portions 244 are inserted along the guide passage 545 of the sleeve housing 54.

Figure 7:
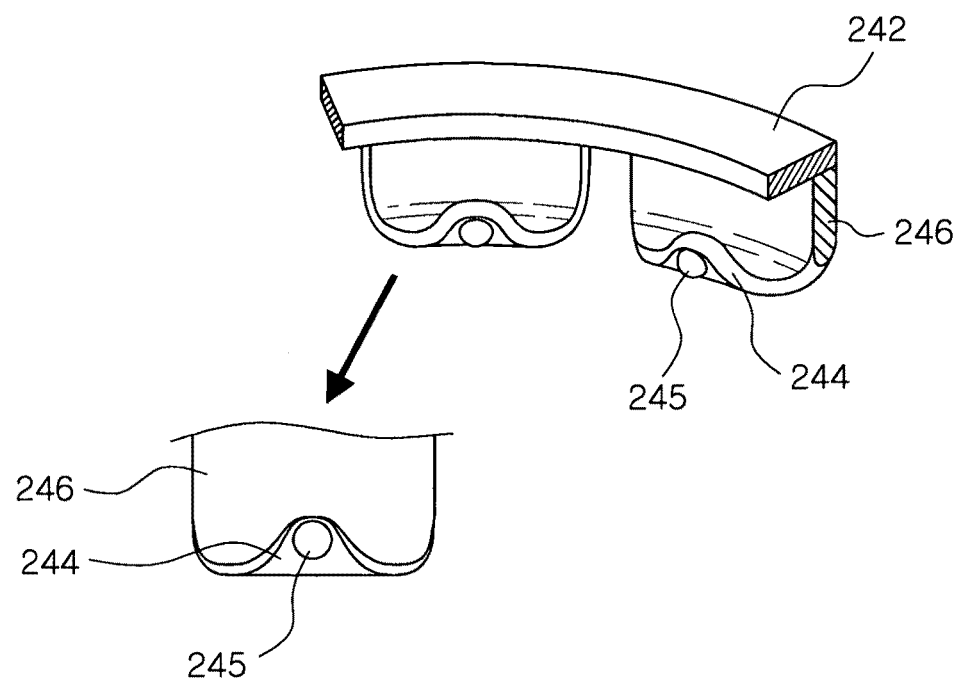
FIG. 7 is a schematic view illustrating hook portions of a coupling hook according to another exemplary embodiment of the present invention.

The hook portions 244 of the coupling hook 24 according to another exemplary embodiment, shown in FIG. 7, have a smaller width than the support portions 246, and the guide protrusion 245 having a round shape are formed inwardly of the hook portions 244 along the inner diameter direction.

The guide protrusion 245 and the hook portion 244 may be modified into various shapes as long as they allow for the spiral rotation of the guide passage 545.

Figure 8:
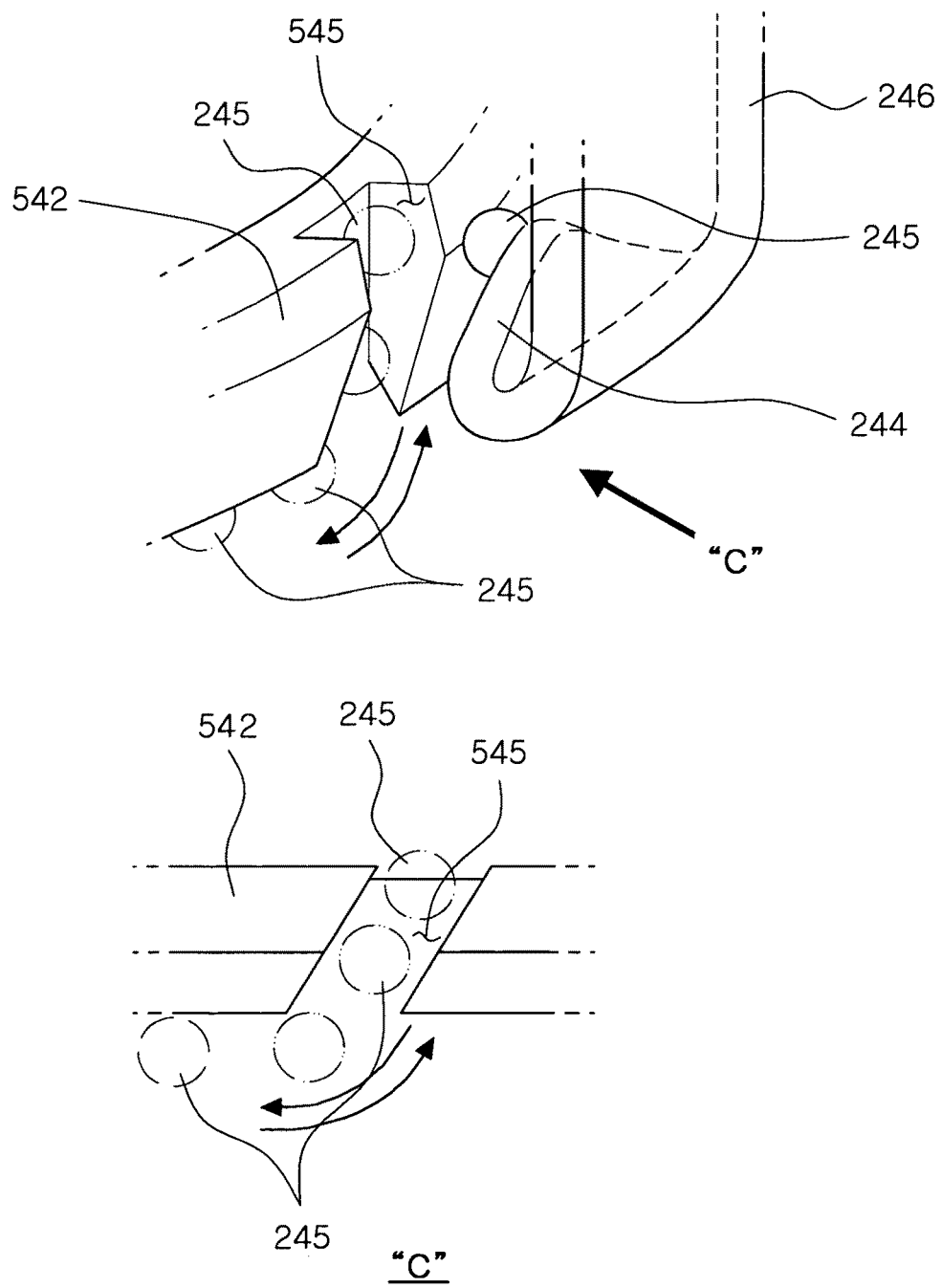
FIG. 8 shows a partially exploded perspective view schematically illustrating an engagement between a coupling hook and a hook portion according to an exemplary embodiment of the present invention and a schematic front view as viewed in direction C.

FIG. 8 shows a partially exploded perspective view schematically illustrating an engagement between a coupling hook and hook portions and a schematic view as viewed in direction C.

In FIG. 8, engagement and disengagement between the coupling hook 24 and the projection 542 are indicated by arrows.

As the coupling hook 24 and the projection 542 are engaged with or released from each other by rotation, the reuse of the rotor case 22 is allowed.

As set forth above, according to exemplary embodiments of the invention, as the coupling hook of the rotor case is rotatably assembled to the projection of the sleeve housing, the coupling hook is not deformed to thereby reduce RRO variations.

Furthermore, the rotor case is disassembled from the projection of the sleeve housing by rotating the coupling hook, thereby enabling the reuse of the rotor case.

In addition, since the rotor case is detachable, it is possible to repair circuit components for the driving of the motor inside the rotor case without exchanging the motor.

While the present invention has been shown and described in connection with the exemplary embodiments, it will be apparent to those skilled in the art that modifications and variations can be made without departing from the spirit and scope of the invention as defined by the appended claims.

What is claimed is:

1. A motor comprising:
   a rotor case having a coupling hook extending downward in an axial direction, secured to a shaft, and performing rotation;
   a sleeve supporting the shaft; and
   a sleeve housing having
      a plurality of projections provided at a front end portion of an upper part thereof in the axial direction and protruding from an outer circumferential surface of the sleeve housing in a radial direction, and
      a guide passage inclined to the axial direction and provided between the projections such that the coupling hook moves along the guide passage while the sleeve is pressed and inserted into an inner circumferential surface thereof,
   the coupling hook comprising a plurality of elastic segments, each of which comprises
      a support portion disposed outside the projection in an outer diameter direction, and
      a hook portion extending inwardly from the support portion in an inner diameter direction and comprising a guide protrusion being inserted along the guide passage.

2. The motor of claim 1, wherein the coupling hook further comprises an annular ring fixing the support portion.

3. The motor of claim 2, wherein the annular ring is inserted and fixed into an annular ring insertion groove at least partially provided in the rotor case.

4. The motor of claim 1, wherein the hook portion has a smaller width than the support portion.

5. The motor of claim 4, wherein the hook portion has a shape corresponding to that of the guide passage.

6. The motor of claim 1, wherein the guide passage is provided in a clockwise manner.

7. The motor of claim 1, wherein the guide passage is a groove provided within the projection.

8. The motor of claim 1, wherein the projection comprises a plurality of segments, and
   the guide passage comprises cutting grooves between the plurality of segments of the projection.

9. A motor comprising:
   a rotor case having a coupling hook extending downward in an axial direction, secured to a shaft, and performing rotation;
   a sleeve supporting the shaft; and
   a sleeve housing having a projection provided at a front end portion of an upper part thereof in the axial direction and a guide passage provided along the projection such that the coupling hook moves along the guide passage while the sleeve is pressed and inserted into an inner circumferential surface thereof,
   the coupling hook comprising a plurality of elastic segments, each of which comprises
      a support portion disposed outside the projection in an outer diameter direction, and
      a hook portion extending inwardly from the support portion in an inner diameter direction and comprising a guide protrusion being inserted along the guide passage.

* * * * *